(12) United States Patent
Seifert et al.

(10) Patent No.: US 8,095,393 B2
(45) Date of Patent: Jan. 10, 2012

(54) METHOD AND SYSTEM FOR AUTOMATED PROCESSING OF INSURANCE INFORMATION

(76) Inventors: Michael J. Seifert, Hudson, OH (US);
Jeffrey A. Seifert, Glenn Ellyn, IL (US);
John E. White, Hartville, OH (US)

( * ) Notice: Subject to any disclaimer, the term of this patent is extended or adjusted under 35 U.S.C. 154(b) by 1085 days.

(21) Appl. No.: 11/408,467

(22) Filed: Apr. 21, 2006

(65) Prior Publication Data
US 2006/0241982 A1 Oct. 26, 2006

Related U.S. Application Data

(60) Provisional application No. 60/673,704, filed on Apr. 21, 2005.

(51) Int. Cl.
*G06Q 40/00* (2006.01)
(52) U.S. Cl. ............... 705/4; 705/35; 705/36 R; 705/67; 705/72; 715/38; 715/123; 715/205; 707/101; 709/217
(58) Field of Classification Search ................ 705/35–45
See application file for complete search history.

(56) References Cited

U.S. PATENT DOCUMENTS

| | | | |
|---|---|---|---|
| 5,826,243 A | 10/1998 | Musmanno | |
| 5,870,721 A | 2/1999 | Norris | |
| 5,875,437 A | 2/1999 | Atkins | |
| 5,911,776 A * | 6/1999 | Guck | 709/217 |
| 6,023,708 A | 2/2000 | Mendez | |
| 6,044,349 A | 3/2000 | Tolopka | |
| 6,108,641 A | 8/2000 | Kenna | |
| 6,131,810 A | 10/2000 | Weiss | |
| 6,336,124 B1 * | 1/2002 | Alam et al. | 715/205 |
| 6,397,232 B1 * | 5/2002 | Cheng-Hung et al. | 715/203 |
| 6,484,178 B1 * | 11/2002 | Bence et al. | 1/1 |
| 6,565,000 B2 | 5/2003 | Sehr | |
| 6,606,606 B2 * | 8/2003 | Starr | 705/36 R |
| 6,684,189 B1 * | 1/2004 | Ryan et al. | 705/4 |
| 6,898,597 B1 | 5/2005 | Cook | |
| 6,938,022 B1 * | 8/2005 | Singhal | 705/74 |
| 6,952,780 B2 | 10/2005 | Olsen | |
| 7,089,202 B1 | 8/2006 | McNamar | |
| 7,131,069 B1 * | 10/2006 | Rush et al. | 715/738 |

(Continued)

FOREIGN PATENT DOCUMENTS
WO WO03/096247 * 11/2003

OTHER PUBLICATIONS

"Microsoft and ACORD to Link Insurance Forms to XML Web Services." Microsoft News Center. http://www.microsoft.com/presspass/features/2003/may03/05-19acord.mspx. © 2003.*

*Primary Examiner* — Charles Kyle
*Assistant Examiner* — Robert Niquette
(74) *Attorney, Agent, or Firm* — Lesavich High-Tech Law Group, P.C.; Stephen Lesavich

(57) ABSTRACT

A method and system for automated processing of insurance information. A universal electronic insurance application form is automatically created and sent and received electronically. The universal electronic insurance information form includes a set of common insurance census information required by health insurance carriers to provide health insurance quotes. The universal electronic insurance information form is used to obtain group health insurance rate quotes automatically from multiple health insurance carriers.

10 Claims, 6 Drawing Sheets

U.S. PATENT DOCUMENTS

| | | | |
|---|---|---|---|
| 7,143,051 B1* | 11/2006 | Hanby et al. | 705/4 |
| 7,174,322 B2* | 2/2007 | Kosuda | 705/72 |
| 2002/0029158 A1* | 3/2002 | Wolff et al. | 705/4 |
| 2002/0120476 A1* | 8/2002 | Labelle et al. | 705/4 |
| 2002/0184163 A1* | 12/2002 | Lotter et al. | 705/67 |
| 2005/0108062 A1* | 5/2005 | Higgins | 705/4 |
| 2006/0100944 A1* | 5/2006 | Reddin et al. | 705/35 |
| 2009/0076858 A1* | 3/2009 | Ika et al. | 705/4 |

* cited by examiner

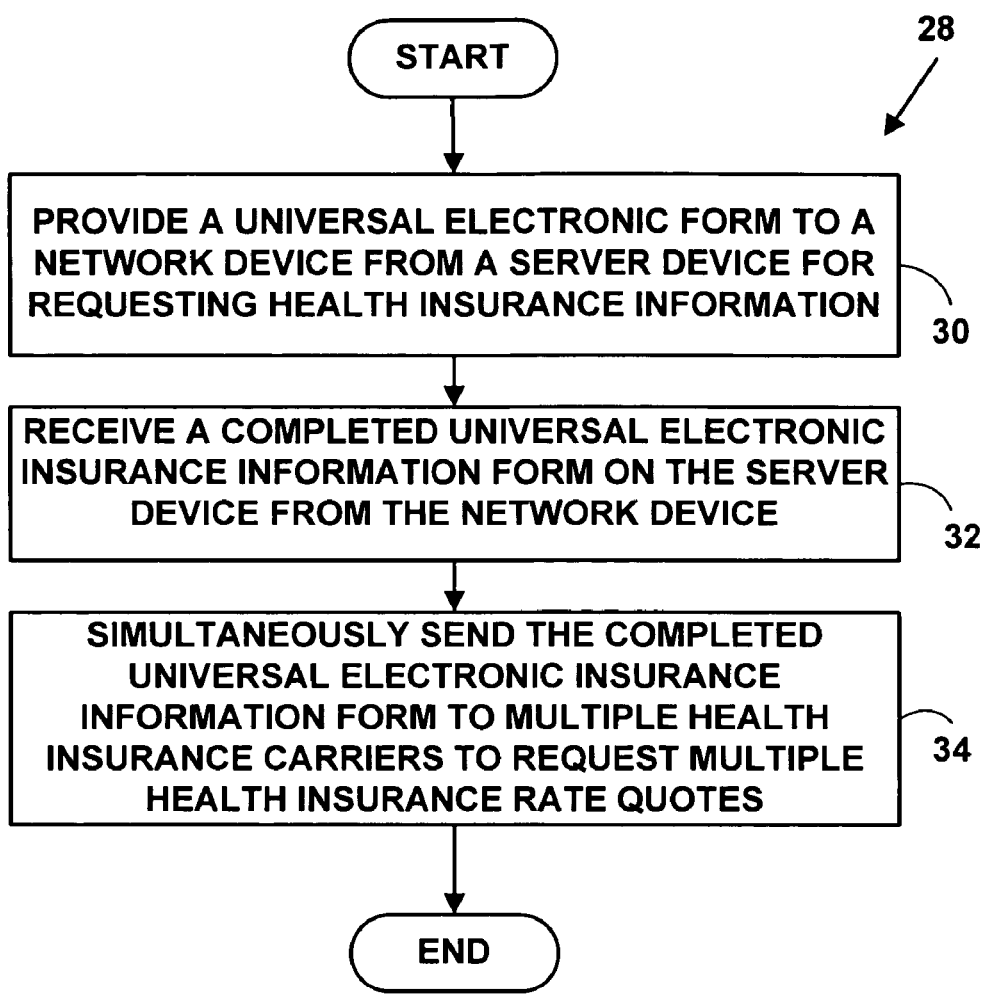

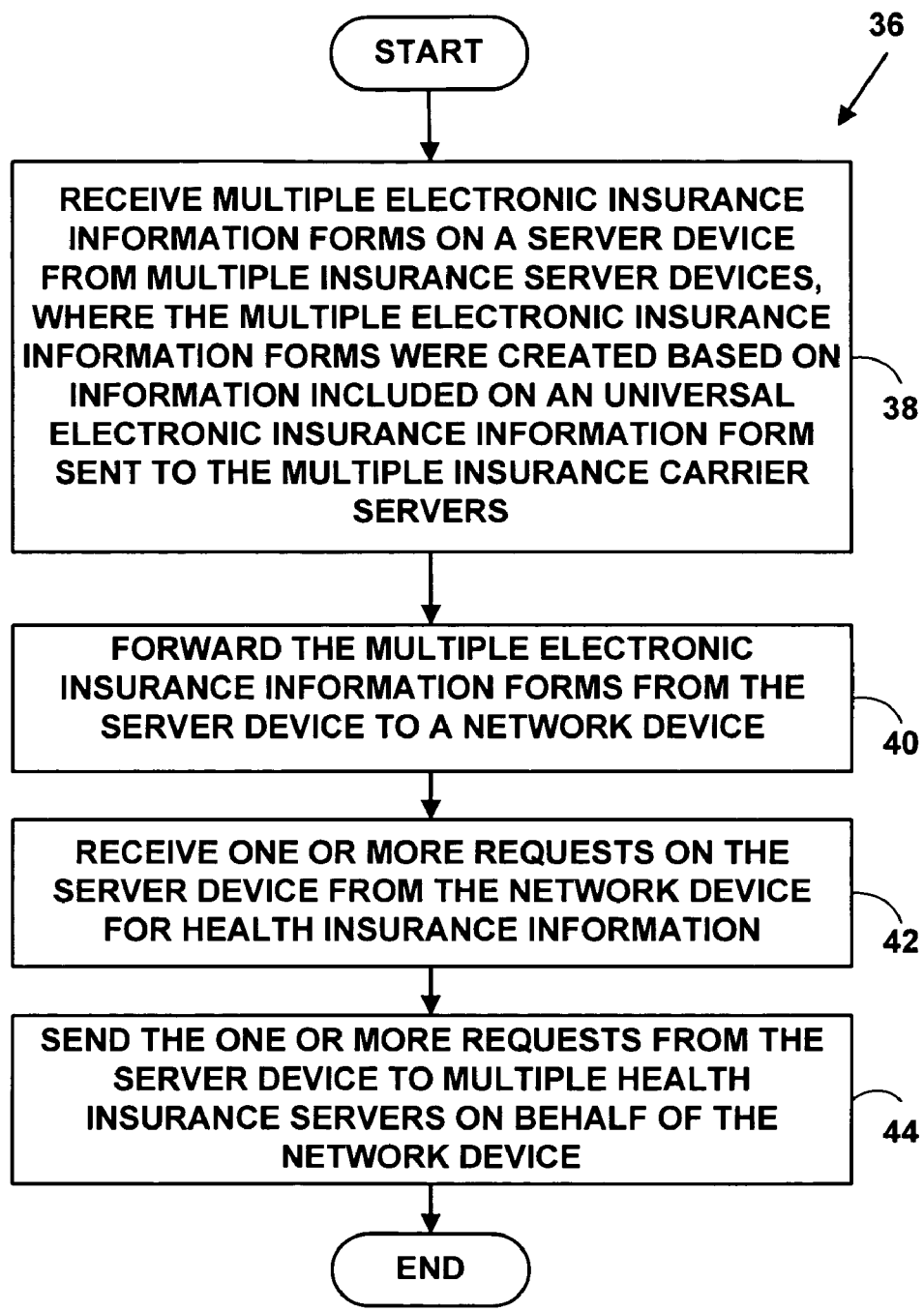

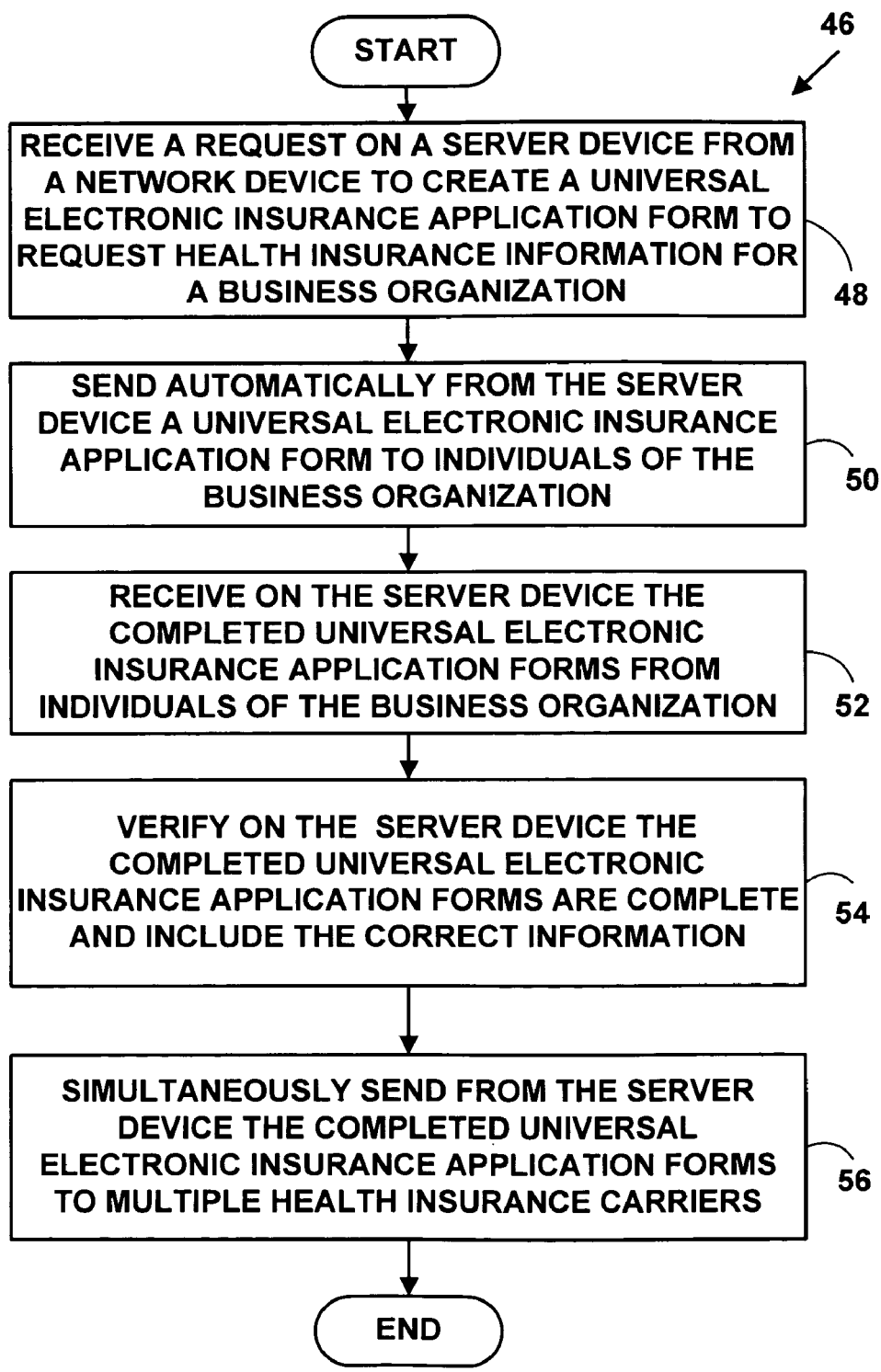

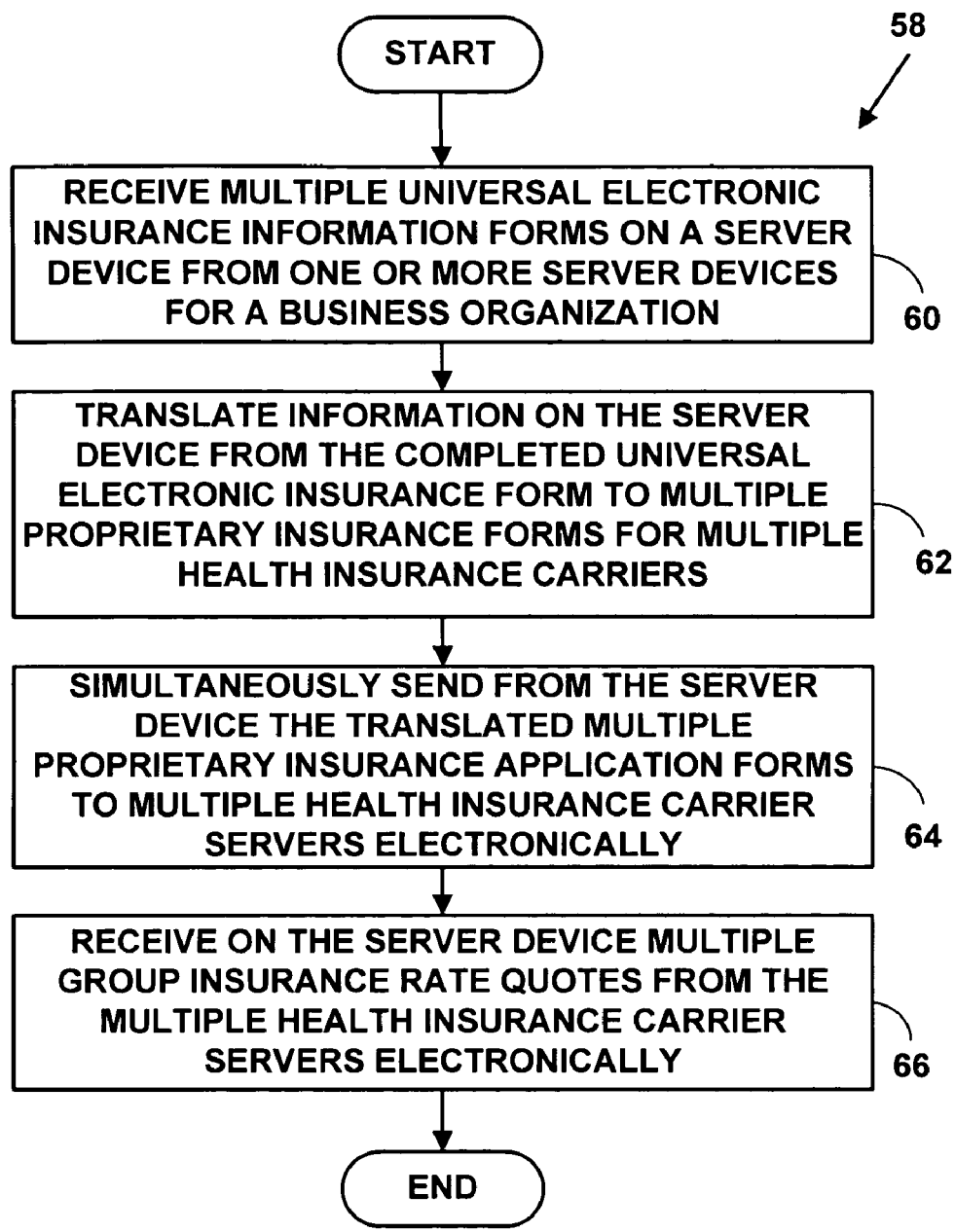

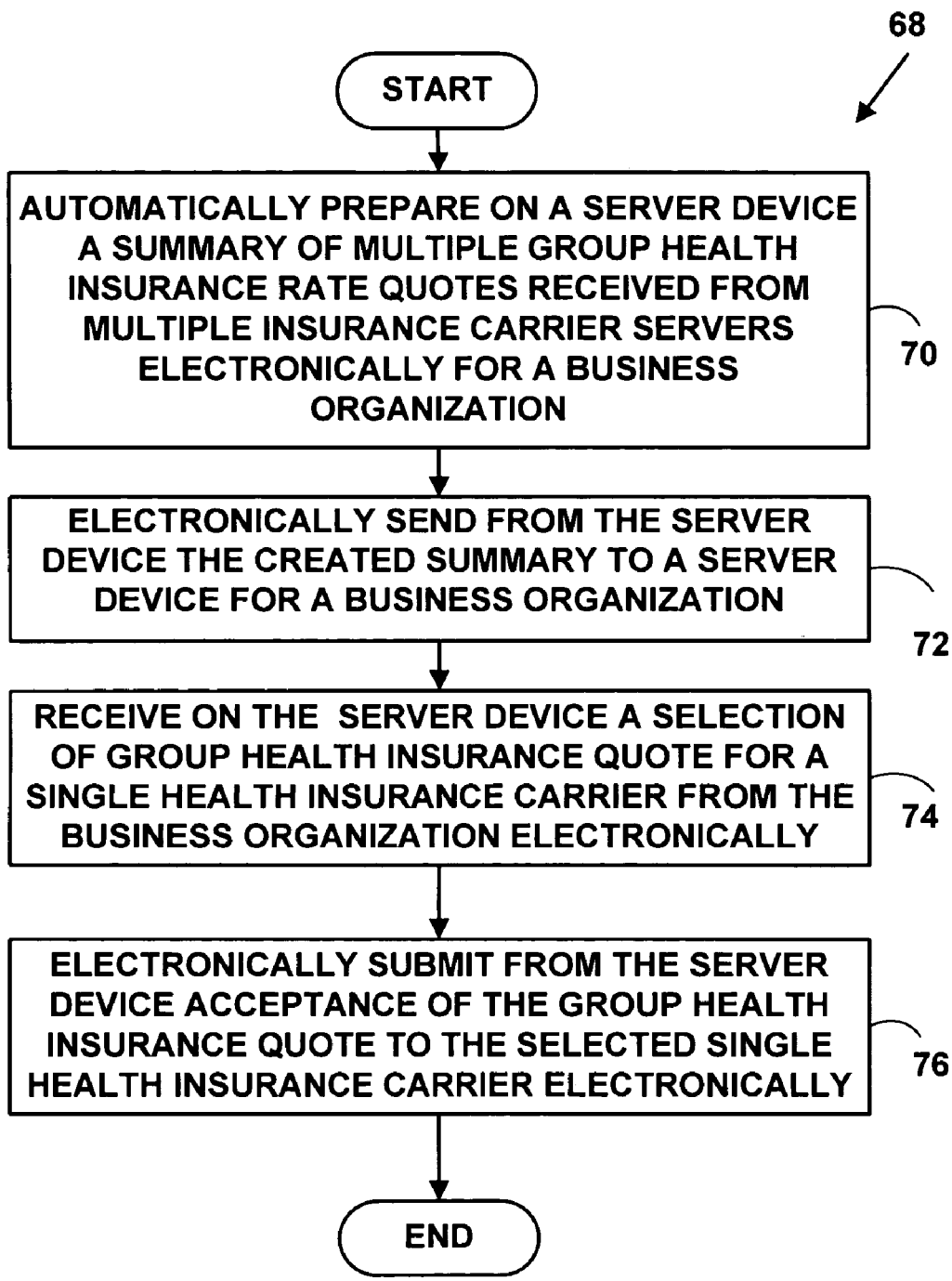

METHOD AND SYSTEM FOR AUTOMATED PROCESSING OF INSURANCE INFORMATION

CROSS REFERENCES TO RELATED APPLICATIONS

This application claims priority to U.S. Provisional Patent Application 60/673,704, filed, Apr. 21, 2005, the contents of which are incorporated by reference.

FIELD OF INVENTION

This invention relates to information processing. More specifically it relates to a method and system for automated processing of insurance information.

BACKGROUND OF THE INVENTION

Business organizations typically provide health insurance for their employees. This health insurance is typically a group health insurance policy. To apply for group health insurance, a business organization requests a census from form provided by an insurance broker. The census form requires the business organization to provide information about each of its employees who will be covered by the group health insurance policy and the type of coverage desired.

The multiple carriers each generate a preliminary insurance quote for the group health insurance as well as provide information and details about the group health insurance plan such as coverage limits, deductibles, etc. The insurance broker sorts the preliminary insurance quotes and forwards them back to the business organization along with proprietary insurance forms required by the insurance carrier.

The business organization selects the insurance provider that is most appropriate, (i.e., typically the lowest cost) and requests that each employee fill out personal and medical information on the proprietary insurance forms. The completed proprietary insurance forms are returned to the broker. The insurance provider and/or the insurance broker reviews the proprietary insurance forms and returns forms to the business organization that include missing or incorrect information.

When all the proprietary insurance forms are correct, they are returned to the insurance broker who forwards them to an insurance underwriter for the selected insurance carrier. The insurance carrier provides a final cost estimate to the insurance broker who forwards it to the business organization. If the final cost estimate is too high or the terms of coverage are not what the business organization wants, this process is repeated for other group health insurance providers.

There are many problems associated with providing group health insurance to business organizations. One problem is that due to the continually rising costs of group health insurance, business organizations typically request new quotes from multiple insurance carriers for group health insurance each time a group health insurance policy expires.

Thus, it is desirable to solve some of the problems associated with providing group health insurance to business organizations.

SUMMARY OF THE INVENTION

In accordance with preferred embodiments of the present invention, some of the problems associated with providing group health insurance to business organizations are overcome. A method and system for automated processing of insurance information is presented.

A universal electronic insurance application form is automatically created and sent and received electronically. The universal electronic insurance information form includes multiple portions to obtain information about a business organization and individuals within a business organization required by health insurance carriers to provide group health insurance quotes. The universal electronic insurance information form is used to automatically obtain group health insurance rate quotes automatically from multiple health insurance carriers.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 2 is a flow diagram illustrating a method for automated insurance information processing;

FIG. 3 is a flow diagram illustrating a method for automated insurance information selection;

FIG. 4 is a flow diagram illustrating a method for automated insurance information selection;

FIG. 5 is a flow diagram illustrating a method for automated insurance information selection; and FIG. 6 is a flow diagram illustrating a method for automated insurance information selection.

DETAILED DESCRIPTION OF THE INVENTION

Exemplary Automated Insurance Process System

Figure 1:
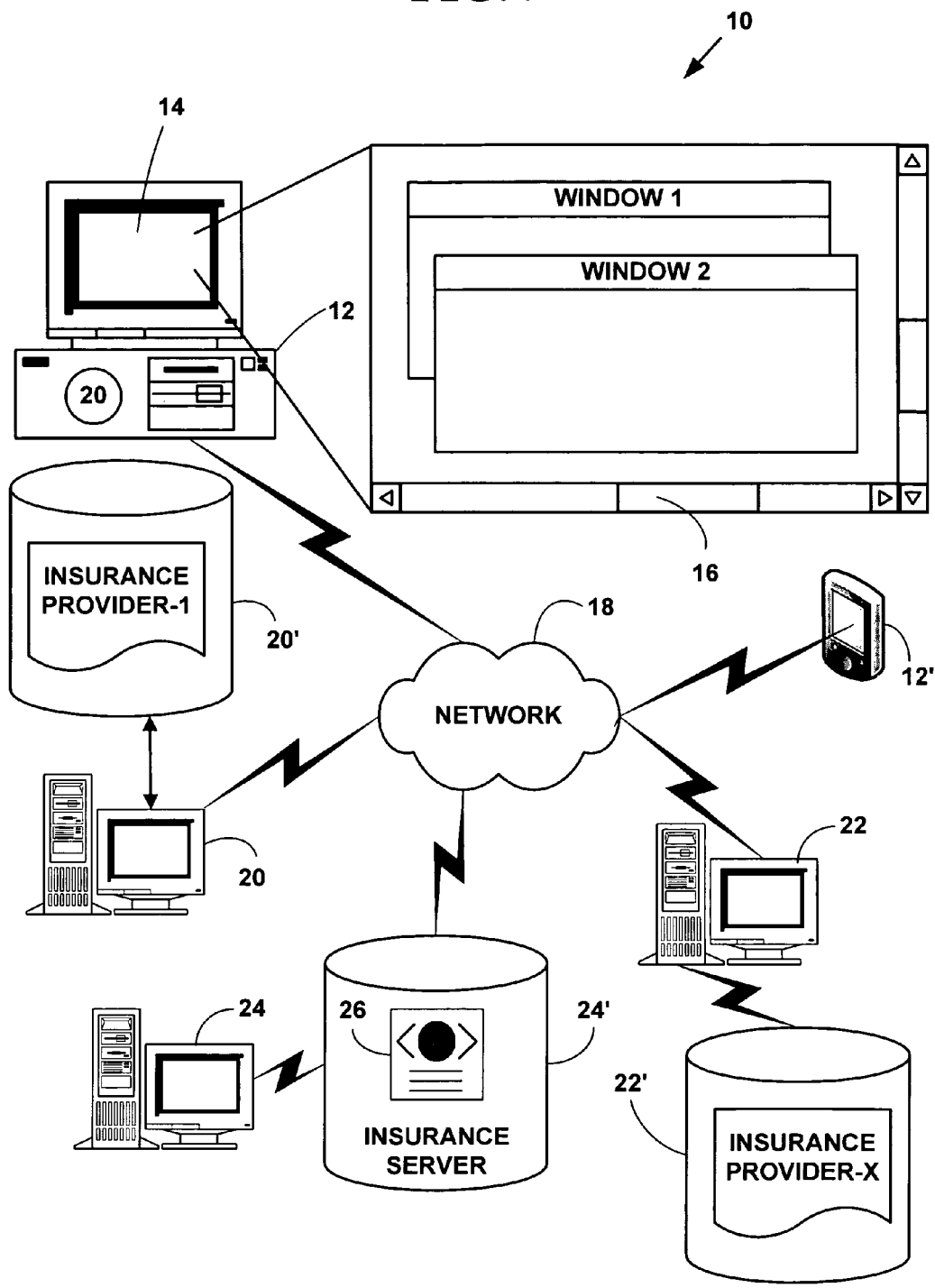
FIG. 1 is a block diagram of an exemplary automated insurance processing information system.

FIG. 1 is a block diagram illustrating an exemplary automated insurance processing system 10. The exemplary automated system 10 includes, but is not limited to, one or more network devices 12 (two of which are illustrated) including a computer with an associated display 14. The display 14 presents a windowed graphical user interface (GUI) 16 with multiple windows to a user. The one or more network devices 12 may be replaced with client terminals in communications with one or more servers, a personal digital/data assistant (PDA) 12', a laptop computer, a mobile computer, an Internet appliance, a facsimile device, one or two-way pagers, mobile phones, or other similar mobile or hand-held electronic device.

The one or more network devices 12, 12' are also in communications with a communications network 18 such as the Internet, an intranet, a Local Area Network (LAN) or other computer network. The one or more network devices 12, 12' send and receive information electronically to and from the communications network 18. Functionality of the automated system 10 can also be distributed over plural network devices 12 via the communications network 18.

The communications network 18 includes, but is not limited to, the Internet, an intranet, a wired Local Area Network (LAN), a wireless LAN (WiLAN), a Wide Area Network (WAN), a Metropolitan Area Network (MAN), Public Switched Telephone Network (PSTN) and other types of communications networks 18 providing voice, video and data communications.

The communications network 18 may include one or more gateways, routers, bridges or switches. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards data packets between network segments.

The communications network 18 may include one or more servers 20, 22, 24 (three of which are illustrated) and one or more web-sites accessible by users to send and receive information useable by the one or more network devices 12. The one or more servers, 20, 22, 24 include one or more associated databases 20', 22', 24' for storing electronic information. The one or more servers may also be replaced with other such as facsimile devices, PDAs one or two-way pagers, mobile phones, or other similar mobile or hand-held electronic device that can function as a server device.

The one or more servers 20, 22, 24 are associated with one or more databases 20', 22', 24' includes electronic information in various digital data formats. The one or more databases 20', 22', 24' may be integral to a memory system on the associated servers 20, 22, 24 or in external or internal secondary storage such as a hard disk, floppy disk, optical disk, or other non-volatile mass storage devices. The one or more network devices 12 include one or more applications 20 for presenting electronic information to a user. The one or more applications 20 include, but is not limited to, one or more software clients and one or more content readers.

In one exemplary embodiment, insurance agents, insurance brokers, to managing general agents (MGA), insurance carriers, business organizations, employees and individuals all access the automated insurance processing system 10 with a browser via the server 24 and the communications network 18. In such an embodiment, server 24 is also a web-server that allows access to the system 10 as well as processes inputs and outputs as described by the methods herein. In such an embodiment, servers 20, 22 are not be used.

Preferred embodiments of the present invention include devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum. However, network devices based on other standards could also be used. IEEE standards can be found on the World Wide Web at the Universal Resource Locator (URL) "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." Bluetooth Forum documents can be found at the URL "www.bluetooth.com." WAP Forum documents can be found at the URL "www.wapforum.org." ADSL Forum documents can be found at the URL "www.adsl.com."

An operating environment for devices and interfaces of the present invention include a processing system with one or more high speed Central Processing Unit(s) (CPU) or other processors and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory (RAM)) or non-volatile (e.g., Read-Only Memory (ROM)) mass storage system readable by the CPU. The computer readable medium includes cooperating or interconnected computer readable medium, which exist exclusively on the processing system or be distributed among multiple interconnected processing systems that may be local or remote to the processing system.

As is known in the art, the Open Systems Interconnection (OSI) reference model is a layered architecture that standardizes levels of service and types of interaction for computers exchanging information through a communications network. The OSI reference model separates network device-to-network device communications into seven protocol layers, or levels, each building—and relying—upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

In one embodiment of the present invention, the communications network 18 includes wired and wireless interfaces. The wired interfaces include, but are not limited to, wired interfaces and corresponding networking protocols for wired connections to the PSTN or CATV including HDTV that connect the network devices via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others.

In one embodiment, of the invention, the wireless interfaces include WPAN wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, two-way pager, etc.)

Typically, a wireless personal area network uses some technology that permits communication only within about 10 meters. One such technology is "Bluetooth." Another such technology is "Zigbee."

A key concept in WPAN technology is known as "plugging in." In the ideal scenario, when any two WPAN-equipped devices come into close proximity (within several meters of each other) or within a few kilometers of a central server (not illustrated), they can communicate via wireless communications as if connected by a cable. WPAN devices can also lock out other devices selectively, preventing needless interference or unauthorized access to secure information.

In one embodiment of the present invention, the wireless interfaces include but are not limited to, an IEEE 802.11a, 802.11b, 802.11g, 802.11n, 802.15.4 (ZigBee), 802.16a, 802.16g, "Wireless Fidelity" (Wi-Fi), "Worldwide Interoperability for Microwave Access" (WiMAX), ETSI High Performance Radio Metropolitan Area Network (HIPERMAN) "RF Home," Bluetooth or other types of wireless interfaces. There are also the services from mobile phone carriers, such as Evolution Data Optimized (EVDO) and other Broadband wireless devices that can be used for the wireless interfaces. However, the present invention is not limited to such wireless interface and other types of wireless interfaces can also be used.

In another embodiment of the present invention, the wireless mesh network device 14, 16, 18, 22 includes a wireless sensor device that comprises an integral or separate Bluetooth and/or infra data association (IrDA) module for wireless Bluetooth or wireless infrared communications.

As is known in the art, an 802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

As is known in the art, Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL "www.weca.net."

As is known in the art, 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz ISM band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the URL "www.ieee802.org" and "www.zigbee.org" respectively.

As is known in the art, WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org." ETSI HIPERMAN can be used to provide a WLP.

As is known in the art, Bluetooth is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. is incorporated herein by reference.

The communications network 18 includes, but is not limited to data networks using the Transmission Control Protocol (TCP), User Datagram Protocol (UDP), Internet Protocol (IP) and other data protocols used to send and receive information to and from a client application 20.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is know in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 18 and the present invention is not limited to TCP/UDP/IP.

The electronic information in the one or more database 20', 22', 24' include one or more different types of insurance information. The insurance information includes group health insurance information and insurance broker information. The database 24' includes a universal electronic insurance information form 26 that is provided by an insurance broker server 24 as is explained below.

Security and Encryption

Devices and interfaces of the present invention include security and/or encryption methods for secure communications. For example, because insurance information is sent over the communications network 18, the communications may be encrypted or otherwise sent securely to comply with the Health Insurance Portability and Accountability Act ("HIPAA") 42 U.S.C. 1320d, et. seq. and other Federal and state laws enacted to protect privacy.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wireless or Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the URL "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MACS). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, the HyperText Transport Protocol (HTTP) Secure (HTTPs), is a standard for encrypted communications on the World Wide Web. HTTPs is actually just HTTP over a Secure Sockets Layer (SSL). For more informaiton on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digistal signatures. The security method are negotiated between the source and destination at the start of establishing a protocol session. The SSL 2.0 protocol specification, by Kipp E. B. Hickman, 1995 is incorporated herein by reference. More information on SSL is available at the URL See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

Automated Insurance Information Processing

FIG. 2 is a flow diagram illustrating a Method 28 for automated insurance information processing. At Step 30, a universal electronic insurance information form is provided to a network device from a first server device. The universal electronic insurance information form includes a plurality of portions for obtaining a set of common information required by health insurance carriers to provide insurance price quotes. At Step 32, a completed universal electronic insurance information form is received on the first server device from the network device. At Step 34, the completed universal electronic insurance information form is simultaneously sent to multiple health insurance carriers to request multiple health insurance rate quotes.

Method 28 is illustrated with an exemplary embodiment. However, the present invention is not limited to this exemplary embodiment and other embodiments can also be used to practice the invention.

In such an exemplary embodiment at Step 30, a universal electronic insurance information form 26 is provided to a network device 12 via an insurance server device 24 over the communications network 18. In one specific embodiment, the universal electronic insurance information form 26 includes a first portion to provide a health insurance census for a business organization as well as a second portion to provide medical history information, prescriptions, etc. for individuals (e.g., employees, principals, etc.) of a business organization. The universal electronic insurance information form is provided to a business organization that desires group health insurance price quotes. However, the present invention is not limited to such an embodiment and the universal electronic insurance information form 26 can be other electronic documents and provided for other than group health insurance information.

In one embodiment, the universal electronic insurance information form 26 includes an electronic form including, but not limited to, a Hyper Text Markup Language (HTML), Extensible Markup Language (XML), flash media, Java, Visual Basic and various combinations thereof. The universal electronic insurance information form 26 includes space for a set of common insurance census information required by insurance carriers to provide insurance quotes as well as space for medical history information, prescriptions, etc. for individuals.

In another embodiment, the universal electronic insurance information form 26 includes universal information for other than health insurance including life, auto, property or other types of insurance.

In one specific embodiment, the universal electronic insurance information form 26 is used for obtaining group health insurance for a business organization. In such an exemplary embodiment, the set of common information includes, but is not limited to, name, address, telephone number of business organization, number of employees, personal and medical history information for employees, type of medical provider such as health maintenance organization (HMO), preferred provider organization, (PPO), preferred health insurance companies (e.g., Blue Cross Blue Shield, Humana, etc.), etc.

At Step 32, a completed universal electronic insurance information form 26 is received on the server device 24 from the network device 12. The completed universal electronic insurance information form 26 may be received as electronic data (e.g., e-mail, XML or HTML form, etc.) via the communications network 18, as an image from a fax machine, as scanned image or via other electronic or non-electronic formats.

In one embodiment, the completed electronic insurance information form includes an embedded bar-code for applying it to an original employee profile and adding it to a database 24' for easy tracking and retrieval.

At Step 34, the completed universal electronic insurance information form 26 is simultaneously sent to multiple insurance carriers to request multiple electronic insurance quotes for the business organization. The completed universal electronic insurance information form 26 allows the business organization to fill out one universal insurance census form instead of multiple proprietary forms for multiple insurance carriers to receive an insurance rate quote from an insurance carrier.

In one embodiment, the completed universal electronic insurance information form 26 is simultaneously sent electronically to multiple insurance carrier servers 20, 22. In another embodiment, the completed universal electronic insurance information form 26 is simultaneously sent to multiple insurance carriers via facsimile. In another embodiment, the completed universal electronic insurance information form 26 is simultaneously sent to multiple insurance carriers via regular or express mail. However, the present invention is not limited to these embodiments and other embodiments can be used to practice the invention.

In another embodiment, at Step 34, the universal electronic insurance information form 26 is simultaneously sent to one or more intermediate parties such as insurance agents and/or insurance brokers and/or to MGAs for review and/or processing before send to the insurance carriers. For example, the insurance agents, insurance brokers or MGA could review the applications prior to sending them to the insurance carrier.

FIG. 3 is a flow diagram illustrating a Method 36 for automated insurance information selection. At Step 38, multiple electronic insurance information forms are received on a first server device from multiple other server devices. The multiple electronic insurance information forms were created based on information included on a universal electronic insurance information form sent to the multiple other server devices. At Step 40, the multiple electronic insurance information forms are forwarded from the first server device to a network device. At Step 42, one or more requests are received on the first server device from the network device for insurance information. At Step 44, the first service device sends the one or more requests to the selected insurance carriers on behalf of the network device.

Method 36 is illustrated with an exemplary embodiment. However, the present invention is not limited to this exemplary embodiment and other embodiments can also be used to practice the invention.

In such an exemplary embodiment at Step 38, multiple electronic insurance price quotes are received electronically on an insurance server device 24 from one or more insurance carriers. The multiple electronic insurance information forms were created based on information included on a universal electronic insurance information form 26. In one embodiment, the multiple insurance price quotes are received from one or more insurance carrier servers 20, 22. In another embodiment, the multiple insurance price quotes are received by facsimile, regular or express mail or in other electronic or non-electronic formats from insurance carriers.

At Step 40, the multiple electronic insurance price quotes and coverage terms and plans are forwarded electronically from the insurance server device 24 to a network device 12 via the communications network 18. In another embodiment, the electronic insurance price quotes are received by facsimile, regular or express mail or in other electronic or non-electronic formats.

In another embodiment, a notification of the multiple electronic insurance price quotes is sent to the network device 12. For example, this notification is implemented as an email notification to network device 12 and the receiving party will log into the insurance server 26 via a browser to review and retrieve the information.

At Step 42, one or more electronic insurance price quotes requests are received on the insurance server device 24 from the network device 12 for group health insurance price quote information. In another embodiment, the electronic insurance price quotes are received by facsimile, regular or express mail or in other electronic or non-electronic formats.

At Step 44, the insurance server device 24 sends a notification for the one or more group health insurance price quote requests to the appropriate other servers 20, 22 on behalf of the network device 12. This "forwarding" is implemented as an email notification to the receiving party and the receiving party will log into the server via a browser to review and retrieve the information.

Automated Insurance Information Selection

FIG. 4 is a flow diagram illustrating a Method 46 for automated insurance information selection. At Step 48, a request is received on a first server device from a network device to create a universal electronic insurance application form to request health insurance information. At Step 50, a universal electronic insurance application form is automatically sent electronically from the server device to the electronic addresses of individuals of the business organization. At Step 52, the server device receives multiple completed universal electronic insurance application forms from individuals of the business organization. At Step 54, the server device verifies the multiple completed universal electronic insurance application forms are complete and include the correct information. At Step 56, the server device simultaneously sends the multiple completed universal electronic insurance application forms to multiple health insurance carrier servers.

Method 46 is illustrated with an exemplary embodiment. However, the present invention is not limited to this exemplary embodiment and other embodiments can also be used to practice the invention.

In such an exemplary embodiment at Step 48, a request is received on an insurance broker server device 24 from a network device 12 to create a universal electronic insurance application form 26 to request group health insurance price quote information. The request includes a list of business organization information such as name, address, phone number, etc. and a list of electronic addresses for all individuals of the business organization who desire to be covered by an insurance policy obtained by the business organization. In one embodiment the electronic addresses include electronic mail (e-mail), addresses, text messages addresses and other types of electronic addresses for individuals of the business organization. However, the electronic address may also include a network address (e.g., IP address) for a network device 12, a telephone number for a mobile phone, facsimile machine, pager or other electronic device. The electronic address may also include a physical or street address.

At Step 50, a universal electronic insurance application form 26 is automatically sent electronically from the server device 24 to the electronic addresses of individuals of the business organization. In one embodiment, the universal electronic insurance application form is an XML form or an electronic link to an XML form that is e-mailed to the e-mail address of individuals of the business organization included in the request. In such an embodiment, a welcome note and an explanation is also included in the e-mail sent to the individuals. However, if an individual of the business organization does not have an e-mail address, the electronic address may include a number for a facsimile machine for which a paper copy of the universal application can be obtained. The electronic address may include a physical address, such as the address of the business organization or an office in the business organization or a home address for the employee for which a paper copy of the universal application can be mailed using postal mail, express mail, etc.

At Step 52, the server device 24 receives the completed multiple universal electronic insurance application forms from individuals of the business organization. In one embodiment, all of the individuals of the business organization have e-mail addresses, so the server device 24 receives all of the completed universal electronic insurance application forms electronically. In another embodiment of the invention, not all of the individuals of the business organization have e-mail addresses so the server device 24 may receive universal electronic insurance application forms electronically that were printed, filled out on paper and scanned into portable data format (PDF), graphic interchange format (GIF), tagged image file format (TIFF), or other graphical formats. In another embodiment, one or more universal electronic insurance application forms that were printed on paper are received in a paper format. The paper format forms are converted into electronic format and provided to the server device 24.

In one embodiment, any paper produced and sent to a fax machine or sent via regular or express mail to a physical address is bar coded, these documents may be faxed or transmitted directly into the insurance server 24 for automatic indexing and linking to the appropriate employee profile. The insurance server 24 includes Image Character Recognition (ICR) and/or Optical Character Recognition (OCR) which translates hand printed forms into computer readable data.

At Step 54, the server device 24 verifies the completed multiple universal electronic insurance application forms are complete and includes the correct information. If any information is missing or incorrect the completed universal electronic insurance application form is returned to the appropriate employee electronically for correction. This ensures that all individual information is complete and correct before the completed universal electronic insurance application forms are sent to any insurance carriers.

At Step 56, the server device 24 sends the multiple completed universal electronic insurance application forms to multiple health insurance carrier servers 20, 22. The multiple health insurance carriers 20, 22 provide the network device 12 with multiple electronic insurance price quotes.

FIG. 5 is a flow diagram illustrating a Method 58 for automated insurance information selection. At Step 60, a first server device receives multiple completed universal electronic insurance application forms from one or more network devices at a business organization. At Step 62, the first server device translates information from the multiple completed universal electronic insurance forms to multiple proprietary insurance forms for each of multiple insurance carriers. At Step 64, the first server device simultaneously sends the translated multiple proprietary insurance application forms to multiple insurance carrier servers electronically. At Step 66, the first server device receives multiple insurance rate quotes from the multiple insurance carrier servers electronically for the business organization.

Method 58 is illustrated with an exemplary embodiment. However, the present invention is not limited to this exemplary embodiment and other embodiments can also be used to practice the invention.

In such an exemplary embodiment at Step 60, an insurance server device 24 receives multiple completed universal electronic insurance application forms from individuals of a business organization via one or more network devices 12 at the business organization. At Step 62, the insurance server device 24 translates information from the multiple completed universal electronic insurance forms to multiple proprietary insurance forms for each of multiple health insurance carriers. At Step 64, the insurance server device 24 simultaneously sends the translated multiple proprietary health insurance application forms to multiple health insurance carrier servers 20, 22 electronically. At Step 66, the server device 24 receives multiple group health insurance rate quotes from the multiple insurance carrier servers 20, 22 electronically for the business organization.

FIG. 6 is a flow diagram illustrating a Method 68 for automated insurance information selection. At Step 70, a first server device automatically prepares a summary of multiple group health insurance rate quotes received from multiple health insurance carrier servers electronically for a business organization. At Step 72, the first server device sends electronically the summary to a server device for a business organization. At Step 74, the first server device receives a selection of a single group health insurance carrier from the business organization server electronically. At 76, the first server device electronically submits acceptance of the group health insurance rated quote to the selected health insurance carrier server 20, 22 electronically.

Method 68 is illustrated with an exemplary embodiment. However, the present invention is not limited to this exemplary embodiment and other embodiments can also be used to practice the invention.

In such an exemplary embodiment at Step 70, an insurance server device 24 automatically prepares a summary of multiple insurance rate quotes received from multiple insurance carrier servers 20, 22 electronically for a business organization.

At Step 72, the insurance server device 24 electronically sends the summary to a second server device for a business organization. In another embodiment, the summary are sent facsimile, regular or express mail or in other electronic or non-electronic formats to the business organization.

In one embodiment, at Step 72, the first server device 24 creates a collection of required signatures from each employee on the selected insurance carriers' proprietary insurance forms. The first server device 24 generates the "final" paper on the insurance carriers' form with a barcode that can be printed for each employee to sign. These signature forms are then transmitted or faxed to the server 24 for final distribution to the insurance carrier. In one embodiment, this step includes feeding the electronic employee data directly into an insurance carriers' system 20, 22 for determining immediate employee eligibility, thereby reducing data entry for the insurance carrier. In one embodiment, insurance cards can be distributed directly back to each employee from the insurance carrier system 20, 22.

At Step 74, the first server device 24 receives a selection of a single group health insurance carrier from the business organization electronically. In another embodiment, the selection is sent by facsimile, regular or express mail or in other electronic or non-electronic formats to the business organization.

At Step 76, the first server device 24 electronically submits acceptance of the group health insurance rated quote to the selected health insurance carrier server 20 or 22 electronically.

In another embodiment, the accepted insurance rate quote is sent by facsimile, regular or express mail or in other electronic or non-electronic formats to the business organization.

The methods and systems described herein may provide at least the following benefits: (1) Higher quote volume and exposure to more underwriting opportunities; (2) More accurate, readable and fully-completed applications from agencies; (3) Drastically reduced time and cost of processing quotes and applications; (4) Higher % of quotes are full screen to agent; (5) Standardized interface with Agents; and (6) Flexibility to rapidly institute underwriting changes; (6) Elevate status as trusted advisor to business owner and carriers; (7) Differentiate value offering via proactive analysis tools & managing client's "balance sheet of health"; (8) Increase new sales closure rate; (9) Earn right to become client's AOR; (9) Increase client renewal, retention and cross-sale opportunities; (10) Reduce time/cost of doing business; and (10) Increase accuracy and efficiency of transactions.

The methods and systems described herein with respect to business organizations can also be used by individuals to obtain rate quotes for insurance sold to individuals.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

We claim:

1. A method for automated insurance information processing, comprising:

providing automatically a universal electronic insurance information form to a network device with one or more processors from an application executing in a computer readable medium on a first server device with one or more processors via a communications network, wherein the universal electronic insurance information form includes a plurality of portions for obtaining a set of common information required by a plurality of health insurance carriers to provide health insurance price quotes, the universal electronic insurance information form including a first portion to provide a health insurance census for a business organization as well as a second portion to provide medical information for individuals within the business organization and wherein the first portion of the universal electronic insurance information form includes universal information for health insurance for the business organization comprising name, address, telephone number of the business organization and number of employees, preferred health insurance companies, and the second portion of the universal electronic insurance information forms includes a plurality of electronic names, addresses, telephone numbers of individuals, personal and medical history information for the individuals and type of medical provider desired;

receiving a completed universal electronic insurance information form on the first server device from the network device;

verifying automatically on the first server device whether information included on the completed universal electronic insurance information form is missing or incorrect and if so, returning the universal electronic insurance information form to the network device for correction before further processing;

simultaneously sending from the first server device via the communications network the completed universal electronic insurance information form to a plurality of health insurance carrier servers to automatically request a plurality of health insurance rate quotes from the plurality of insurance carriers;

receiving on the first server device a plurality of health insurance rate quotes from the plurality of insurance carrier servers;

sending the plurality of received health insurance rate quotes to the network device from the first server device;

receiving on the first server device from the network device a selected health insurance quote selected from the plurality of received health insurance rate quotes for a selected insurance carrier;

sending from the first server device to a server for the selected insurance carrier via the communications network an electronic acceptance of the selected health insurance quote for the business organization;

receiving on the first server device a plurality of additional completed universal electronic insurance information forms from the network device;

translating automatically on the first server device the plurality of additional completed universal electronic insurance information forms into a plurality of proprietary insurance forms for the selected insurance carrier; and sending from the first server device the plurality of proprietary insurance forms to the server for the selected insurance carrier via the communications network to complete acceptance of a group health insurance policy associated with the selected health insurance quote.

2. The method of claim 1 wherein the providing step includes securely providing the universal electronic insurance information form to the network device from the first server device.

3. The method of claim 1 wherein universal electronic insurance information form includes a Hyper Text Markup Language (HTML), Extensible Markup Language (XML), flash media, Java, Visual Basic or combinations thereof.

4. The method of claim 1 wherein the universal electronic insurance information form also includes universal information for life, auto, property or casualty insurance.

5. The method of claim 1 further comprising:

receiving on the first server device from the server for the selected insurance carrier via the communications network a plurality of health insurance cards for individuals within the business organization who are being covered by health insurance from the selected insurance carrier;

distributing the plurality of health insurance cards from the first server device via the communications network to individuals within the business organization using the plurality of electronic addresses from the universal electronic insurance information form, wherein the plurality of electronic addresses include electronic mail (e-mail) addresses, text messages addresses and physical addresses for individuals within the business organization.

6. The method of claim 5 further comprising:
distributing the plurality of health insurance cards from the server for the selected insurance carrier via the communications network to individuals within the business organization using the plurality of electronic addresses from the universal electronic insurance information form, wherein the plurality of electronic addresses include electronic mail (e-mail) addresses, text messages addresses and physical addresses for individuals within the business organization.

7. The method of claim 1 further comprising:
receiving a request on the first server device from another network device with one or more processors via the communications network to create a new universal electronic insurance application form for a business organization to request insurance information for the business organization, wherein the request includes a plurality of electronic information comprising list of business organization information and a list of a plurality of electronic addresses for all employees of the business organization who desire to be covered by a group health insurance policy obtained by the business organization;
creating the new universal electronic insurance application form with the plurality of electronic information included in the request; and
sending from the first server device via the communications network the created new universal electronic insurance application form to the plurality of electronic addresses of individuals within the business organization.

8. The method of claim 1 wherein a connection between the first server network device and the communications network includes a wireless connection comprising a 802.11a, 802.11b, 802.11g, 802.11n, 802.15.4 (ZigBee), 802.16a, 802.16g, Wireless Fidelity (Wi-Fi), or a Worldwide Interoperability for Microwave Access (WiMAX) wireless connection.

9. A non-transitory computer readable medium having storing therein a plurality of instructions for causing one or more processors to execute the steps of:
providing automatically a universal electronic insurance information form to a network device with one or more processors from an application on a first server device with one or more processors via a communications network, wherein the universal electronic insurance information form includes a plurality of portions for obtaining a set of common information required by a plurality of health insurance carriers to provide health insurance price quotes, wherein the universal electronic insurance information form includes a first portion to provide a health insurance census for a business organization as well as a second portion to provide medical information for individuals within the business organization and wherein the first portion of the universal electronic insurance information form includes universal information for health insurance for the business organization comprising name, address, telephone number of the business organization and number of employees, preferred health insurance companies, and the second portion of the universal electronic insurance information forms includes name, address, telephone number of individuals, personal and medical history information for individuals and type of medical provider desired;
receiving a completed universal electronic insurance information form on the first server device from the network device;
verifying automatically on the first server device whether information included on the completed universal electronic insurance information form is missing or incorrect and if so, returning the universal electronic insurance information form to the network device for correction before further processing;
simultaneously sending from the first server device via the communications network the completed universal electronic insurance information form to a plurality of health insurance carrier servers to automatically request a plurality of health insurance rate quotes from the plurality of insurance carriers;
receiving on the first server device a plurality of health insurance rate quotes from the plurality of insurance carrier servers;
sending the plurality of received health insurance rate quotes to the network device from the first server device;
receiving on the first server device from the network device a selected health insurance quote selected from the plurality of received health insurance rate quotes for a selected insurance carrier;
sending from the first server device to a server for the selected insurance carrier via the communications network an electronic acceptance of the selected health insurance quote for the business organization;
receiving on the first server device a plurality of additional completed universal electronic insurance information forms from the network device;
translating automatically on the first server device the plurality of additional completed universal electronic insurance information forms into a plurality of proprietary insurance forms for the selected insurance carrier; and
sending from the first server device the plurality of proprietary insurance forms to the server for the selected insurance carrier via the communications network to complete acceptance of a group health insurance policy associated with the selected health insurance quote.

10. A system for automated insurance information processing, comprising in combination:
means for providing automatically a universal electronic insurance information form to a network device with one or more processors from an application on a first server device with one or more processors via a communications network, wherein the universal electronic insurance information form includes a plurality of portions for obtaining a set of common information required by a plurality of health insurance carriers to provide health insurance price quotes, wherein the universal electronic insurance information form includes a first portion to provide a health insurance census for a business organization as well as a second portion to provide medical information for individuals within the business organization and wherein the first portion of the universal electronic insurance information form includes universal information for health insurance for the business organization comprising name, address, telephone number of the business organization and number of employees, preferred health insurance companies, and the second portion of the universal electronic insurance information forms includes name, address, telephone number of individuals, personal and medical history information for individuals and type of medical provider desired;

means for receiving a completed universal electronic insurance information form on the first server device from the network device;
means for verifying automatically on the first server device whether information included on the completed universal electronic insurance information form is missing or incorrect and if so, returning the universal electronic insurance information form to the network device for correction before further processing;
means for simultaneously sending from the first server device via the communications network the completed universal electronic insurance information form is a plurality of health insurance carrier servers to automatically request a plurality of health insurance rate quotes from the plurality of insurance carriers;
means for receiving on the first server device a plurality of health insurance rate quotes from the plurality of insurance carriers;
means for sending the plurality of received health insurance rate quotes to the network device from the first server device;
means for receiving on the first server device from the network device a selected health insurance quote selected from the plurality of received health insurance rate quotes for a selected insurance carrier;
means for sending from the first server device to a server for the selected insurance carrier via the communications network an electronic acceptance of the selected health insurance quote for the business organization;
means for receiving on the first server device a plurality of additional completed universal electronic insurance information forms from the network device;
means for translating automatically on the first server device the plurality of additional completed universal electronic insurance information forms into a plurality of proprietary insurance forms for the selected insurance carrier;
means for sending from the first server device the plurality of proprietary insurance form to the server for the selected insurance carrier via the communications network to complete acceptance of a group health insurance policy associated with the selected health insurance quote;
means for receiving on the first server device from the server for the selected insurance carrier via the communications network a plurality of health insurance cards for individuals within the business organization who are being covered by health insurance from the selected insurance carrier; and
means for distributing the plurality of health insurance cards from the first server device via the communications network to individuals within the business organization using the plurality of electronic addresses from the universal electronic insurance information form, wherein the plurality of electronic addresses include electronic mail (e-mail) addresses, text messages addresses and street addresses for individuals within the business organization.

* * * * *